United States Patent
Uchida et al.

(10) Patent No.: US 12,096,128 B2
(45) Date of Patent: Sep. 17, 2024

(54) IMAGE PROCESSING APPARATUS, INFORMATION PROCESSING SYSTEM, AND IMAGE ACQUISITION METHOD

(71) Applicant: Sony Interactive Entertainment Inc., Tokyo (JP)

(72) Inventors: Masaki Uchida, Tokyo (JP); Fumiaki Takenaka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 140 days.

(21) Appl. No.: 17/575,046

(22) Filed: Jan. 13, 2022

(65) Prior Publication Data
US 2022/0294962 A1    Sep. 15, 2022

(30) Foreign Application Priority Data
Mar. 10, 2021    (JP) .................................. 2021-038650

(51) Int. Cl.
*H04N 23/73*    (2023.01)
*H04N 23/68*    (2023.01)
*H04N 23/72*    (2023.01)

(52) U.S. Cl.
CPC ......... *H04N 23/73* (2023.01); *H04N 23/6812* (2023.01); *H04N 23/72* (2023.01)

(58) Field of Classification Search
CPC .... H04N 23/73; H04N 23/6812; H04N 23/72; H04N 23/684; H04N 23/76; H04N 25/53; H04N 13/344
See application file for complete search history.

(56) References Cited

U.S. PATENT DOCUMENTS

| | | | |
|---|---|---|---|
| 2008/0292202 A1* | 11/2008 | Vakrat | G06T 5/002 382/261 |
| 2011/0193990 A1 | 8/2011 | Pillman | |
| 2012/0007996 A1* | 1/2012 | Bilcu | H04N 23/6812 348/208.4 |
| 2015/0002734 A1* | 1/2015 | Lee | G06F 3/0304 348/367 |
| 2015/0312463 A1* | 10/2015 | Gupta | G06T 7/20 348/239 |
| 2018/0324358 A1 | 11/2018 | Yamada | |
| 2021/0034887 A1* | 2/2021 | Tahara | G06V 40/18 |
| 2021/0281758 A1* | 9/2021 | Masuda | H04N 23/683 |
| 2022/0292696 A1* | 9/2022 | Peng | H04N 23/631 |

FOREIGN PATENT DOCUMENTS

EP    0999518 A1    5/2000

OTHER PUBLICATIONS

Extended European Search Report for corresponding EP Application No. 21203929.1, 8 pages, dated Mar. 25, 2022.

* cited by examiner

*Primary Examiner* — Jason A Flohre
(74) *Attorney, Agent, or Firm* — Matthew B. Dernier, Esq.

(57) ABSTRACT

An image processing apparatus includes a parameter control section adapted to acquire, at a predetermined rate, motion information of an imaging apparatus that captures a video and control an exposure time on the basis of the motion information, and an output section adapted to output data obtained by performing a predetermined process on an image captured by the imaging apparatus with the exposure time.

12 Claims, 6 Drawing Sheets

FIG.1
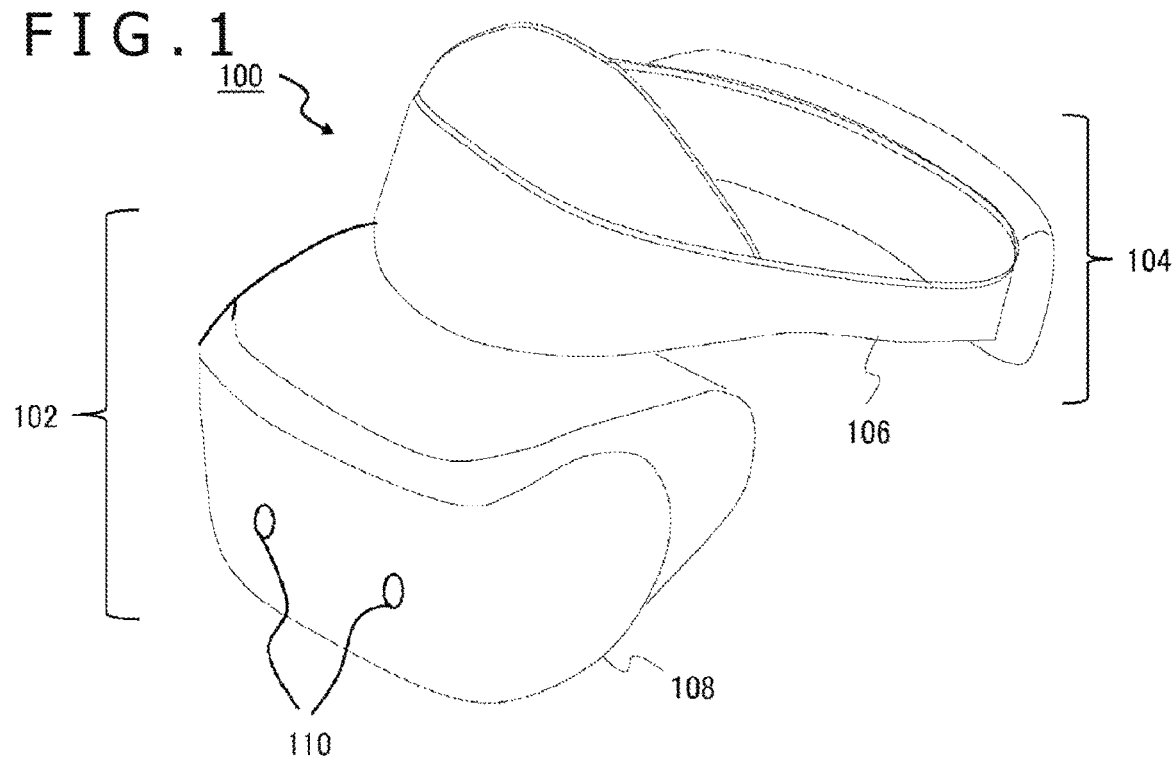
FIG.2A
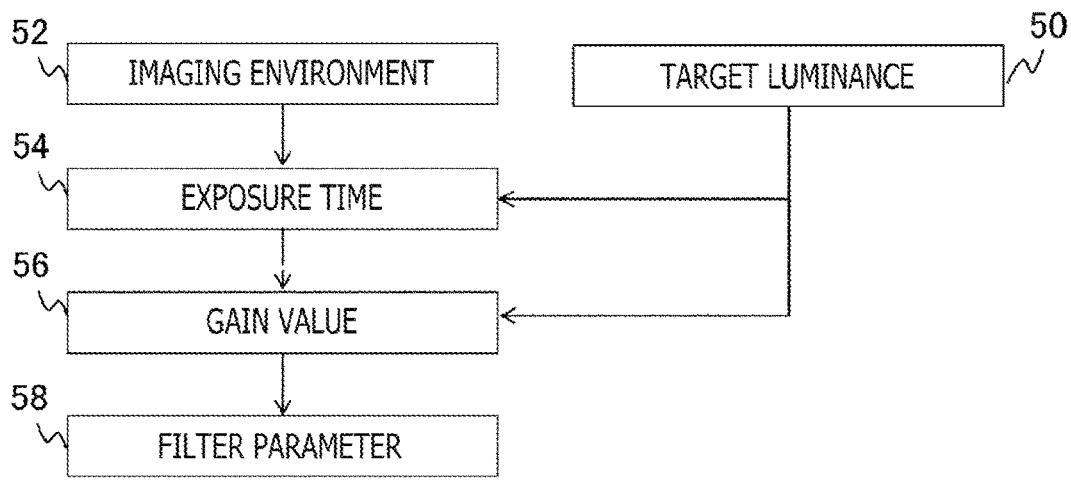
FIG.2B
| IMAGING ENVIRONMENT | BRIGHT | DARK |
|---|---|---|
| EXPOSURE TIME | SHORT | LONG |
| MOTION BLUR (MOTIONLESS) | NONE | NONE |
| MOTION BLUR (IN MOTION) | SMALL | LARGE |

| MOTION | NONE | YES |
|---|---|---|
| EXPOSURE TIME | LONG | SHORT |
| MOTION BLUR | NONE | SMALL |
| (IMAGING ENVIRONMENT) | BRIGHT/DARK | BRIGHT/DARK |

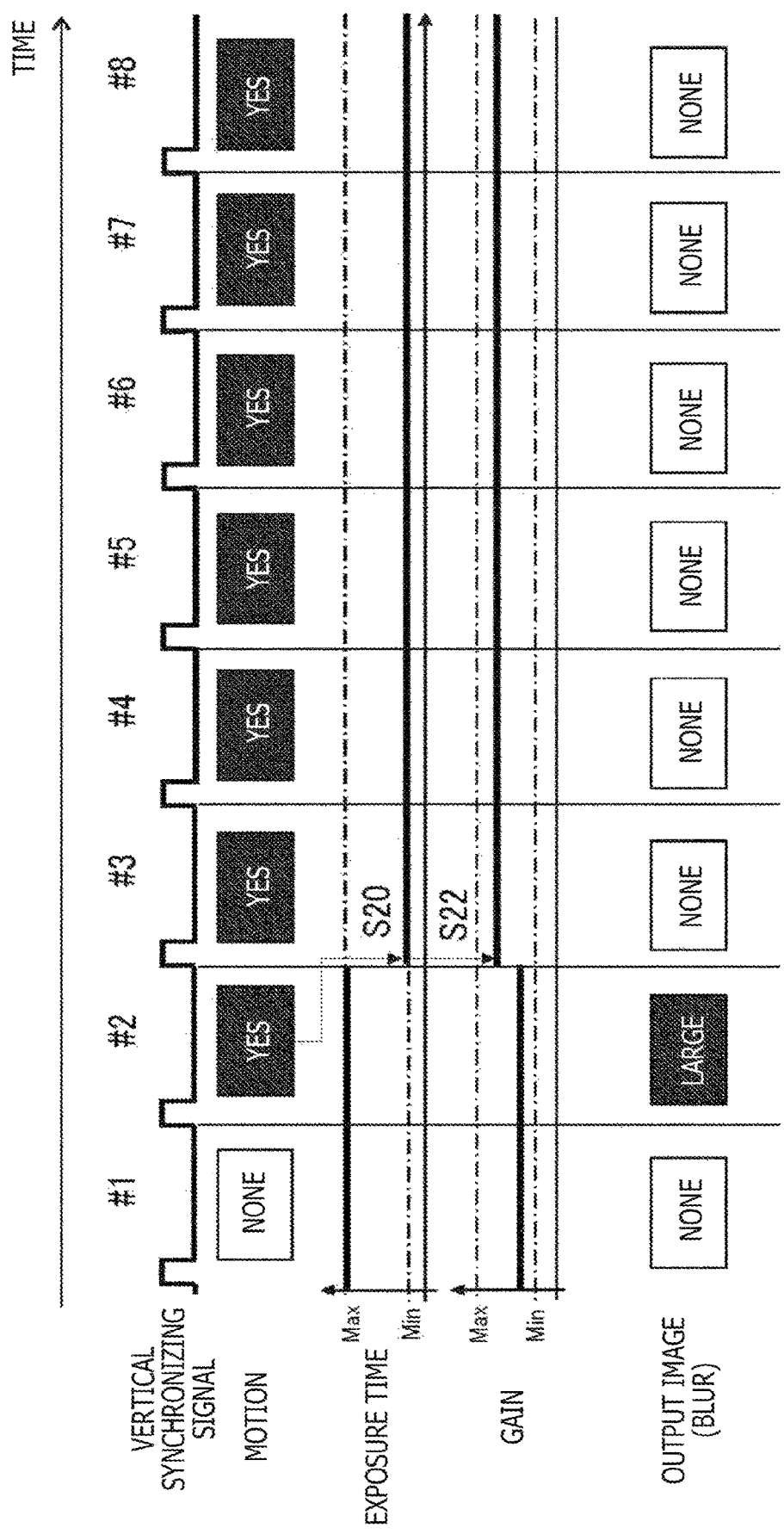

IMAGE PROCESSING APPARATUS, INFORMATION PROCESSING SYSTEM, AND IMAGE ACQUISITION METHOD

CROSS REFERENCE TO RELATED APPLICATION

This application claims the benefit of Japanese Priority Patent Application JP 2021-038650 filed Mar. 10, 2021, the entire contents of which are incorporated herein by reference.

BACKGROUND

The present technology relates to an image processing apparatus that acquires a captured image for acquiring real-world state information, an information processing system that generates the state information in question, and a captured image acquisition method.

There is known a game that captures an image of a user's body or a marker with an imaging apparatus, replaces a silhouette region thereof with another image, and displays the image on a display (refer, for example, to EP 0999518A1). Also there is known a technology that attaches an imaging apparatus to a movable unit such as a vehicle or a robot, to estimate the movable unit's position and recognize surrounding objects by analyzing a captured image. As described above, technologies that acquire various pieces of real-world state information by using a captured image and utilize such information have found application in a wide range of sectors from those for daily life to those for special investigation.

SUMMARY

In an environment where an imaging apparatus itself moves such as when the imaging apparatus is mounted to a movable unit, a movement of the imaging apparatus relative to a subject is larger than that of a stationary imaging apparatus, making it more likely to cause motion blur that causes silhouettes to overlap. Motion blur makes it difficult to extract a feature point or feature quantity which is important for image analysis and aggravates analysis accuracy. The higher the freedom in movement of the imaging apparatus, and the more likely it is that an unexpected movement may occur, the more probable it is that a motion blur problem will become conspicuous and that an analysis result is unstable.

It is desirable to provide a technology that allows real-world state information to be acquired from a captured image with high accuracy even in an environment where an imaging apparatus moves.

According to a mode of the present technology, there is provided an image processing apparatus that includes a parameter control section and an output section. The parameter control section acquires, at a predetermined rate, motion information of an imaging apparatus that captures a video and controls an exposure time on the basis of the motion information. The output section outputs data obtained by performing a predetermined process on an image captured by the imaging apparatus with the exposure time.

According to another mode of the present technology, there is provided an information system that includes the above image processing apparatus, an imaging apparatus, and a motion measurement apparatus. The motion measurement apparatus measures motion information at a predetermined rate.

According to still another mode of the present technology, there is provided an image acquisition method that includes a step of acquiring, at a predetermined rate, motion information of an imaging apparatus that captures a video, a step of controlling an exposure time on the basis of the motion information, and a step of outputting data obtained by performing a predetermined process on an image captured by the imaging apparatus with the exposure time.

It should be noted that any combinations of the above components and conversions of expressions of the present technology between a method, an apparatus, a system, a computer program, a recording medium on which a computer program is recorded, and the like are also effective as a mode of the present technology.

According to an embodiment of the present technology, it is possible to acquire real-world state information from a captured image with high accuracy even in an environment where an imaging apparatus moves.

BRIEF DESCRIPTION OF THE DRAWINGS

FIG. 1 is a diagram illustrating an example of appearance of a head-mounted display to which the present embodiment is applicable;

FIGS. 2A and 2B are diagrams illustrating dependency between parameters associated with common processing of a captured image;

FIG. 6 is a diagram illustrating a relation between exposure time control and an image change in an image processing apparatus of the present embodiment.

DETAILED DESCRIPTION OF THE PREFERRED EMBODIMENT

Figures 3A, 3B:
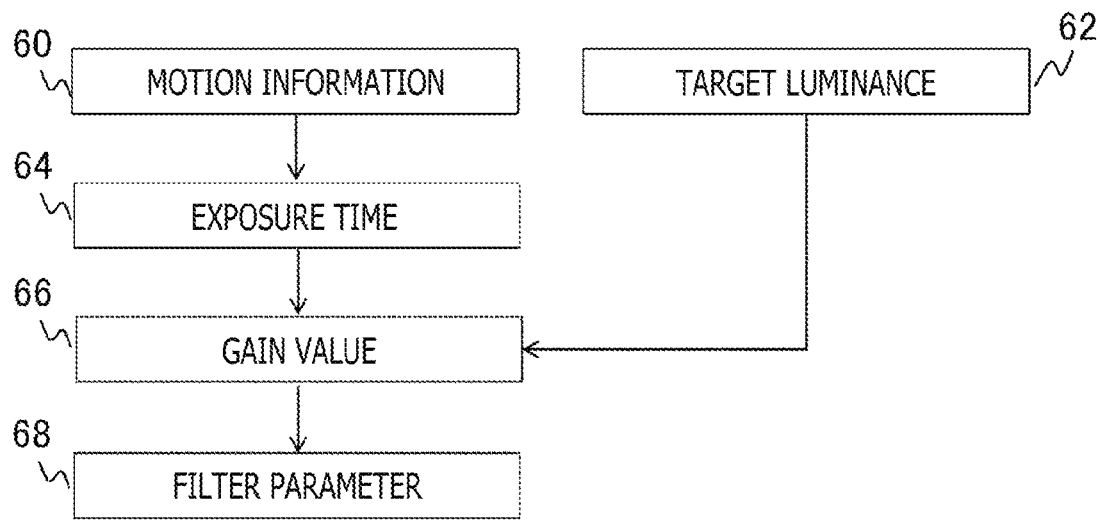
FIGS. 3A and 3B are diagrams illustrating dependency between parameters associated with processing of a captured image in the present embodiment.

The present embodiment relates to a technology that acquires real-world state information by analyzing an image captured in an environment where a movement of an imaging apparatus is permitted. To this extent, the form of implementation of the imaging apparatus is not limited to any particular form, and the imaging apparatus may be mounted to an apparatus that has other applications, such as a head-mounted display, a robot, a mobile terminal, a vehicle, or a drone. Alternatively, the imaging apparatus may be a standalone imaging apparatus that can be moved manually. Hereinafter, a description will be given by citing an imaging apparatus mounted to a head-mounted display as a main example.

FIG. 1 illustrates an example of appearance of a head-mounted display 100 to which the present embodiment is applicable. In this example, the head-mounted display 100 includes an output mechanism section 102 and a wearing mechanism section 104. The wearing mechanism section 104 includes a wearing band 106 that goes around a user's head and fastens the head-mounted display 100 as the user wears the wearing mechanism section 104. The output mechanism section 102 includes a housing 108 and incorporates a display panel. The housing 108 is in such a shape as to cover both left and right eyes with the head-mounted display 100 worn by the user. The display panel is opposed to the eyes when the head-mounted display 100 is worn.

An eyepiece lens is further provided inside the housing 108. The eyepiece lens is located between the display panel and the user's eyes and expands a viewing angle of the user when the head-mounted display 100 is worn. Also, the head-mounted display 100 incorporates an inertial measurement unit (IMU) sensor and detects a translational motion and a rotational motion of the user's head wearing the head-mounted display 100, and by extension, the position and the posture at each time of day. The head-mounted display 100 may further include speakers or earphones at positions corresponding to the user's ears when being worn. Further, the head-mounted display 100 includes, on a front face of the housing 108, imaging apparatuses 110 that capture a video of a real space.

For example, if stereo cameras are used as the imaging apparatuses 110 and images captured from left and right viewpoints are displayed on the display panel as illustrated, video see-through that allows the user to look over a real space can be realized even when the closed-type head-mounted display 100 is used. Meanwhile, it is possible to acquire the position and the posture of the user's head by analyzing a captured video frame. Virtual reality with a good sense of immersion can be realized if the virtual world is drawn in a field of view appropriate to a user's line of sight by using this information. Augmented reality and mixed reality can also be realized by combining computer graphics with a captured image in such a manner as to match the field of view of the captured image.

A variety of algorithms such as visual simultaneous localization and mapping (V-SLAM) have been proposed as techniques for estimating the own position and posture of the imaging apparatus while, at the same time, the imaging apparatus analyzes a captured image and prepares an environmental map. It is possible to increase a level of detail and accuracy of information regarding the position and the posture by integrating an analysis result using a captured image with a measured value of the IMU sensor. It should be noted, however, that contents of image analysis are not limited to any particular contents and that an object in the field of view of the imaging apparatus 110 may be recognized or measured. The imaging apparatus 110 mounted to the head-mounted display 100 is not limited to a stereo camera and may be a multiocular camera having three or more lenses or a monocular camera.

In any case, in a case where the imaging apparatus is mounted to a movable unit such as the head-mounted display 100, motion blur occurs due to the movement of the imaging apparatus. This leads to significant errors in parameters used for analysis, such as a silhouette contour and feature points, which makes image analysis accuracy more susceptible to degradation. A similar problem occurs in various movable units such as an automobile, a robot, and a drone to which an imaging apparatus for analysis is mounted. A similar problem also occurs in a case where the imaging apparatus itself can move.

It should be noted, however, that, in a case where a speed or acceleration changes continuously, it is possible to maintain a certain degree of analysis accuracy by predicting parameters from the movements made up to then or correcting the parameters. Meanwhile, in a case where a direction or a speed of the movement can be changed freely by human intension as with the head-mounted display 100, there is a high possibility that the change will exceed a permissible range and significantly deteriorate the analysis accuracy or render the analysis result unstable.

For example, in a case where the user wears the head-mounted display 100 and plays a battle game, it is probable that the head will move in a complex and abrupt manner in order to avoid oncoming enemies or flying bullets. In a case where a game controller is used, the controller may hit the head, which generates unintentional acceleration caused by an impact. Such a movement which is difficult to predict is not limited to a head-mounted display and can occur in various situations including a case where an autonomous mobile robot climbs over level differences on the ground.

In order to stably acquire an analysis result, it is preferable to ensure that images with minimal motion blur can be continuously captured irrespective of the movement of the imaging apparatus. Meanwhile, a common imaging apparatus automatically adjusts its imaging conditions and image processing to ensure that people perceive a captured image as beautiful. High contrast, high sharpness, and high resolution are examples of factors that allow people to perceive something as beautiful. In order to suitably realize these factors, a common imaging apparatus performs various types of processing and adjustments such as adjustments of its exposure time and gain, a noise reduction process, gamma correction, contrast enhancement, demosaicing, and super resolution in a manner tailored to the brightness of the surrounding area.

FIGS. 2A and 2B illustrate dependency between parameters associated with common processing of a captured image. Of these figures, FIG. 2A illustrates connection between main parameters. First, target luminance 50 that indicates suitable brightness of the image as a whole is set. The brightness of the image as a whole can be expressed, for example, by a center of gravity of a luminance histogram. The imaging apparatus controls an exposure time 54 in keeping with the brightness of an imaging environment 52 to bring the brightness of the captured image as a whole close to the target luminance 50. For example, if it is difficult to acquire sufficient luminance in a dark environment, incident light per pixel increases by extending the exposure time (shutter speed), which increases the luminance.

By setting the exposure time 54 for the target luminance 50 first, it is possible to increase an original light detection value to the extent possible and relatively reduce noise. A gain value 56 is set to amplify the detection value acquired in this manner and bring the detection value even closer to the target luminance 50. In order to reduce noise that has been amplified by the gain adjustment, a filter parameter 58 such as a smoothing filter is set in consideration of the gain value 56. In reality, processing such as gamma correction, contrast enhancement, and super resolution is performed as described above. If the image is a color image, demosaicing, a tone adjustment, and the like are further performed.

As described above, functions of adjusting the exposure relative to the brightness of the surrounding area and adjusting the gain are known as auto exposure (AE) and auto gain control (AGC), respectively. FIG. 2B illustrates a relation between an imaging environment and motion blur in a case where imaging is performed with a common imaging apparatus. According to the connection between the parameters illustrated in FIG. 2A, the exposure time is determined by the brightness or darkness of the imaging environment. Qualitatively, if the imaging environment is bright, the exposure time is reduced, and if the imaging environment is dark, the exposure time is increased, as illustrated. It should be noted that the expressions used here are relative ones corresponding to the brightness or darkness of the imaging environment.

Here, if the imaging apparatus and, by extension, the head-mounted display 100 to which the imaging apparatus is mounted do not move, no motion blur occurs regardless of the exposure time. Meanwhile, in a case where the head-mounted display 100 moves, the longer the exposure time, the higher the magnitude of motion blur (the larger the size of the out-of-focus area). As a result, even if the movements of the head-mounted display 100 is making similar movements, the darker the imaging environment, the larger the motion blur.

A possible solution to suppress motion blur would be not to automatically control the exposure time. In this case, it is necessary to keep the exposure time short at all times. This ensures the light detection value to be regularly small including when the head-mounted display 100 stays still. Accordingly, it is necessary to increase the gain, as a result of which a noise component increases. Such an increase in noise becomes conspicuous in a dark environment, which eventually leads to reduced image analysis accuracy. That is, in a case where a common imaging apparatus is adopted, the analysis accuracy of the captured image and, by extension, the quality of user's experience using the head-mounted display 100 depend on the surrounding environment in any case.

Accordingly, in the present embodiment, the exposure time is determined on the basis of the movement of the imaging apparatus. FIGS. 3A and 3B illustrate dependency between parameters associated with processing of a captured image in the present embodiment. FIG. 3A illustrates connection between parameters in the present embodiment in a manner similar to that of FIG. 2A. As compared to FIG. 2A, the present embodiment differs in that an exposure time 64 is determined from motion information 60 instead of from the imaging environment and that a target luminance 62 is used to determine a gain value 66.

Specifically, motion information 60 is acquired from the IMU sensor provided on the head-mounted display 100, and the exposure time 64 is determined on the basis of the acquired motion information 60. Qualitatively, the exposure time is set long if the head-mounted display 100 stays still or moves at a low speed to such an extent as not to cause a motion blur problem, and the exposure time is set short if the head-mounted display 100 moves at a medium or high speed to such an extent as to cause a motion blur problem. Hereinafter, the former state may be referred to as a "motionless" state, and the latter state may be referred to as an "in-motion" state.

The luminance of the image as a whole is maintained at a suitable level by determining the gain value 66 through comparison between the target luminance 62 and the light detection value acquired by the exposure time control described above. It should be noted, however, that, when the exposure time is changed, the gain value 66 is determined in a manner appropriate to the change, as will be described later. Further, a filter parameter 68 for the noise reduction process is determined in a manner appropriate to the gain value 66 in question. As described above, in the present embodiment, captured image processing parameters are controlled on the basis of the motion information 60 of the head-mounted display 100 and, by extension, the imaging apparatus.

Here, the motion information 60 may be at least either an angular speed or acceleration measured by the IMU sensor. Alternatively, the motion information 60 may be a simple measurement result indicating, for example, whether or not there is any motion. Naturally, the more detailed the motion information, the higher the accuracy or the level of detail of the exposure time determined. For example, motion blur becomes more conspicuous in a rotational motion than in a translational motion. Accordingly, it is possible to perform more elaborate control such as reducing the exposure time when a rotational motion occurs.

FIG. 3B illustrates a relation between the motion of the head-mounted display 100 and motion blur in the present embodiment. As described above, it is possible to suppress motion blur as compared to the example illustrated in FIGS. 2A and 2B by reducing the exposure time in an in-motion state. It is possible to maintain the luminance of the image as a whole by increasing the gain value to the same extent as the exposure time is reduced. For example, in a case where the exposure time is changed to 1/N-th the original value, the gain value is increased N times from the original value. Although this causes the noise component (signal-to-noise (S/N) ratio) to increase, this increase is temporary. In addition, effects of motion blur can be suppressed. Accordingly, on the whole, it is possible to increase the image analysis accuracy.

As described above, the exposure time can be extended to the extent possible in a motionless state by assuring an adequate exposure time in an in-motion state, which makes it possible to acquire a captured image with minimal noise with a small gain. In a motionless state, motion blur naturally does not occur. Accordingly, it is possible to increase the image analysis accuracy thanks to synergy with small noise. In FIG. 3B, a change in imaging environment is also added. In the present embodiment, the exposure time is determined by whether or not there is a motion. Accordingly, it is possible to minimize effects of surrounding brightness.

It should be noted that, because the light detection value itself naturally changes depending on the brightness or darkness, absolute values of the gain value and the filter parameter change. Qualitatively, the detection value is smaller at a dark location than at a bright location, which causes a large gain to be applied and increases the noise component. However, as long as there is no motion of the head-mounted display 100, the exposure time can be kept long, which minimizes noise.

In a case where only a captured image is used for image analysis, it is unnecessary to add factors that allow people to perceive something as beautiful as described above, at a later stage. Rather, processing performed by an image sensor on a light detection result such as contrast enhancement and super resolution changes original silhouette information or adds extra information and can be hindrances from the viewpoint of image analysis accuracy. Accordingly, in the present embodiment, it is preferable to perform only noise reduction as image processing to be performed after the gain adjustment. Also, a grayscale image having only magnitudes of the luminance as its pixel values is suitably captured in consideration of the fact that spatial resolution decreases due to splitting of light if a color image is captured.

Figure 4:
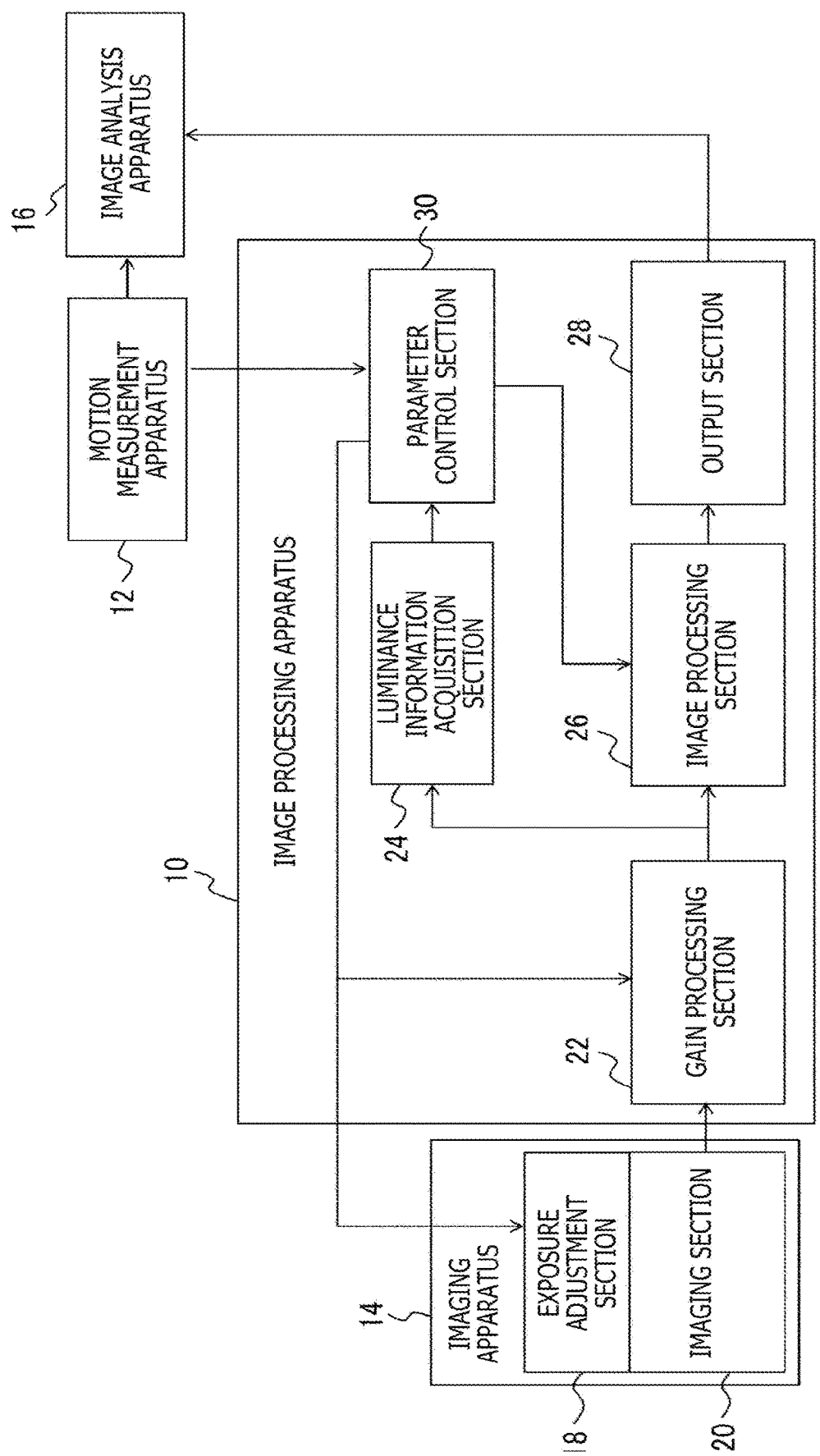
FIG. 4 is a diagram illustrating a configuration of an information processing system to which the present embodiment is applicable.

FIG. 4 illustrates a configuration of an information processing system to which the present embodiment is applicable. An information processing system 8 includes an imaging apparatus 14, an image processing apparatus 10, a motion measurement apparatus 12, and an image analysis apparatus 16 and generates real-world information on the basis of at least a captured image. Here, the information processing system 8 is incorporated in a movable unit such as the head-mounted display 100. It should be noted, however, that at least part of the information processing system 8, such as at least either the image processing apparatus 10 or the image analysis apparatus 16, or part of the image processing apparatus 10 may be provided in another apparatus that is connected to the movable unit for communication. At least part of the image processing apparatus 10 may be included in the imaging apparatus 14.

In a case where the information processing system 8 is applied to the head-mounted display 100 in FIG. 1, the imaging apparatus 14 and the motion measurement apparatus 12 correspond to the imaging apparatuses 110 and the incorporated IMU sensor. Hereinafter, a description will be given assuming that the information processing system 8 is mounted to the head-mounted display 100. The imaging apparatus 14 includes an imaging section 20 and an exposure adjustment section 18. The imaging section 20 outputs, at a predetermined rate, a two-dimensional charge distribution (RAW image) obtained by photoelectric conversion of incident light with an imaging element array such as a charge coupled device (CCD) or a complementary metal oxide semiconductor (CMOS). The exposure adjustment section 18 adjusts the exposure time.

The motion measurement apparatus 12 is, for example, an IMU sensor that includes a gyrosensor and an acceleration sensor and detects the posture, a translational motion, and a rotational motion of the head-mounted display 100 at a predetermined rate. The image analysis apparatus 16 generates, at a predetermined rate, real-world information such as the position and the posture of the head-mounted display 100 and information associated with surrounding objects with use of known technologies such as the V-SLAM, object detection, and object recognition by using a captured image. The image analysis apparatus 16 suitably generates real-world information with high accuracy by complementarily using a measured value of the motion measurement apparatus 12 and an image analysis result.

The image processing apparatus 10 generates captured image data to be used for analysis by the image analysis apparatus 16 by processing a RAW image that has been captured by the imaging apparatus 14 and that has yet to be subjected to the gain process. The image processing apparatus 10 can be realized by hardware such as a central processing unit (CPU), a graphics processing unit (GPU), various arithmetic units, and a memory such as a random access memory (RAM) or a read only memory (ROM), or by software such as programs loaded from a recording medium into the memory to provide information processing, image drawing, data input/output, communication, and other functions. Accordingly, it is understood by a person skilled in the art that these functional blocks can be realized in various ways by hardware alone, software alone, or a combination thereof and are not limited to any one of them.

The image processing apparatus 10 includes a gain processing section 22, an image processing section 26, and an output section 28. The gain processing section 22 performs a gain process that amplifies pixel values of a RAW image. The image processing section 26 performs necessary image processing such as a noise reduction process. The output section 28 outputs data that has been subjected to the image processing to the image analysis apparatus 16. The image processing apparatus 10 also includes a luminance information acquisition section 24 and a parameter control section 30. The luminance information acquisition section 24 acquires information associated with the luminance of the image as a whole that has been subjected to the gain process. The parameter control section 30 controls parameters used for imaging and image processing such as an exposure time, a gain value, and a filter parameter.

It should be noted that the gain processing section 22 may include, in detail, an analog gain section, an analog-to-digital (AD) conversion section, and a digital gain section. The analog gain section applies a gain to an analog value output from the imaging section 20. The AD conversion section converts the data in question into a digital value. The digital gain section applies a gain to the digital value. The image processing section 26 sequentially acquires image data whose gain has been adjusted and performs necessary image processing. As described above, the image processing section 26 in the present embodiment suitably performs a noise reduction process but does not perform any other types of processing.

The output section 28 temporarily stores data output from the image processing section 26 in an internal buffer memory, for example, and then supplies the stored data to the image analysis apparatus 16. The image analysis apparatus 16 may read out the data from the buffer memory at a suitable timing. The luminance information acquisition section 24 acquires image data whose gain has been adjusted by the gain processing section 22, generates information indicating the luminance of the image as a whole such as the center of gravity of a luminance histogram, and then supplies the information to the parameter control section 30. The parameter control section 30 determines, at a predetermined rate, the exposure time, the gain value, and the filter parameter from the connection between the parameters illustrated in FIG. 3A.

For example, the parameter control section 30 derives, every frame interval, an amount of change of the head-mounted display 100 by acquiring, at a predetermined rate, a value measured by the motion measurement apparatus 12. Here, the term "amount of change" refers, for example, to a rotation angle about three axes, and the rotation angle is acquired by integrating an angular speed with respect to the frame interval. The parameter control section 30 determines an adequate exposure time on the basis of the derived amount of change per unit time, i.e., the speed, and supplies an exposure time control signal to the exposure adjustment section 18. For example, if the head-mounted display 100 is at a speed equal to or lower than that of a threshold by which the head-mounted display 100 can be considered to be still, the parameter control section 30 sets the exposure time to a preset and defined level.

The exposure time in question is set to an upper limit determined by the frame rate or the longest time to the extent that no saturation occurs. At this time, the parameter control section 30 may adjust the exposure time, commensurate with the brightness of the surrounding area. The parameter control section 30 reduces the exposure time if the speed of the head-mounted display 100 exceeds a threshold and sets the exposure time back to its original time if the speed drops to or below the threshold again. It should be noted that the threshold used as a trigger for changing the exposure time may be the same or different between the case where the speed increases and the case where the speed decreases. It is possible to avoid the exposure time from changing in a short period of time by using different thresholds.

Alternatively, a plurality of thresholds may be set for the speed, and the parameter control section 30 may gradually change the exposure time such that the higher the speed is, the shorter the exposure time is. The exposure adjustment section 18 adjusts the exposure time of the imaging section 20 according to a control signal from the parameter control section 30. Common AE technologies can be used for the adjustment process itself.

The parameter control section 30 determines a gain value for realizing a target luminance by comparing luminance information of the image as a whole supplied from the luminance information acquisition section 24 and the target luminance retained in the parameter control section 30. Meanwhile, when changing the exposure time due to the change of the speed or whether or not there is a motion, the parameter control section 30 changes the gain value immediately in a manner appropriate to that change. This suppresses adverse effects such as succession of frames with insufficient luminance caused by the reduced exposure time or succession of frames with large noise caused by an extra gain despite the fact that the exposure time has been set back to its original time.

The parameter control section 30 sends a control signal to the gain processing section 22 such that the gain is adjusted by the determined value. The gain processing section 22 performs the gain process on the RAW image supplied from the imaging section 20, by using a value commensurate with the control signal in question. The parameter control section 30 may set a gain value to each of the above analog gain section and digital gain section.

Further, the parameter control section 30 estimates noise that can occur commensurate with the magnitude of the gain and determines spatial and temporal filter parameters that are appropriate to the amount of noise. The parameter control section 30 sends a control signal to the image processing section 26 such that the noise reduction process is performed by using the determined parameters. The image processing section 26 performs the noise reduction process on the image that has been subjected to the gain adjustment, by performing a filtering process commensurate with the control signal in question, and outputs the image to the output section 28.

Figure 5:
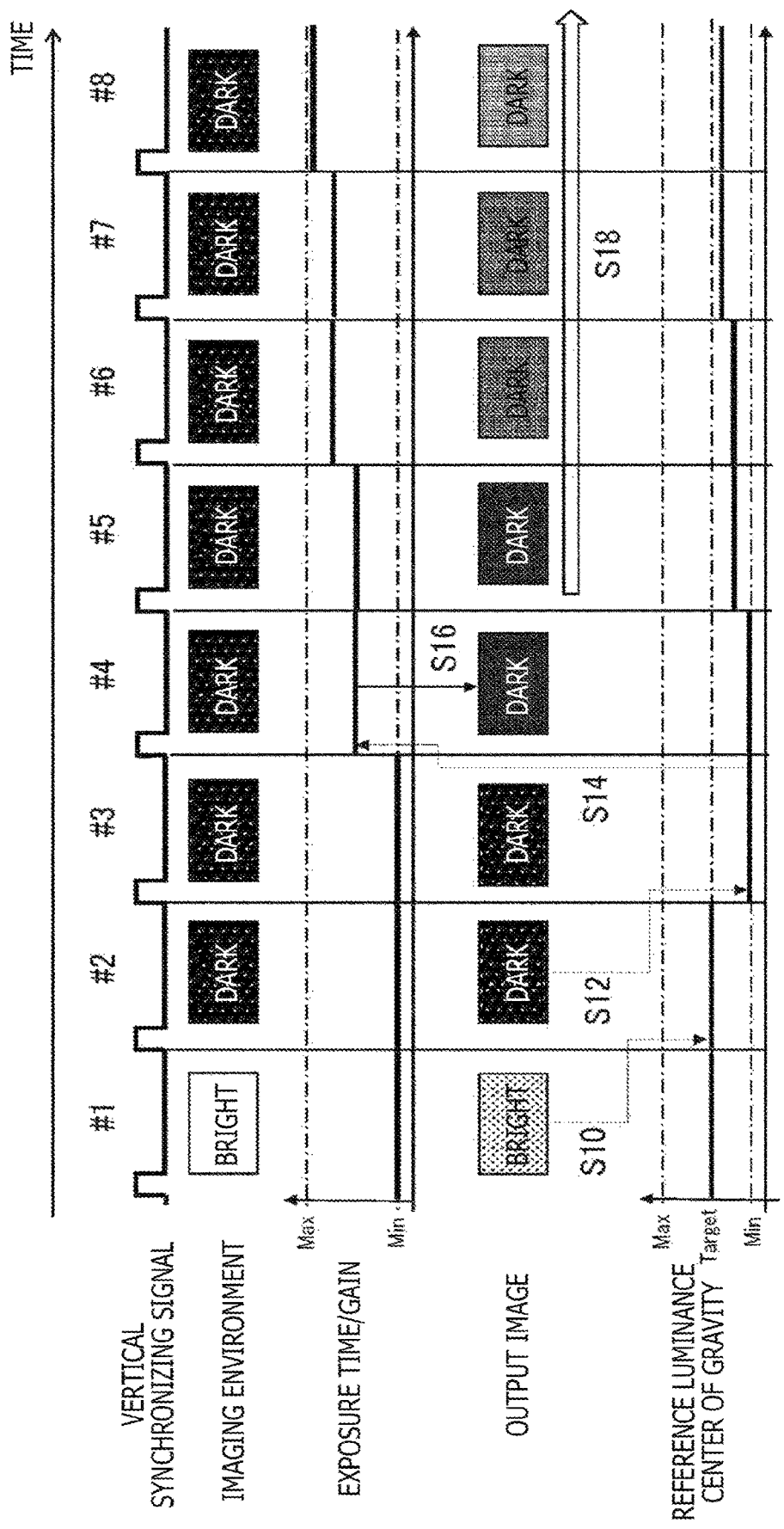
FIG. 5 is a diagram illustrating a relation between exposure control and an image change in a common imaging apparatus.

Next, a common imaging apparatus and the imaging apparatus of the present embodiment will be compared from the viewpoint of responsiveness to exposure time control. FIG. 5 illustrates a relation between exposure control and an image change in a common imaging apparatus. In FIG. 5, the horizontal axis represents passage of time, and each frame is imaged in such a manner as to be synchronous with a vertical synchronizing signal on the top line in FIG. 5. Here, vertical pairs of rectangles illustrated to the right of "IMAGING ENVIRONMENT" and "OUTPUT IMAGE" indicate the states of the imaging environment and the output image of the same frame among frame numbers #1 to #8.

"EXPOSURE TIME/GAIN" on the third line is an exposure time and a gain value set when each frame is imaged, and "REFERENCE LUMINANCE CENTER OF GRAVITY" on the fifth line is a center of gravity of a luminance histogram which is the basis for setting the exposure time and the gain for each frame. In this example, it is assumed that the #1 frame is imaged in a bright environment and the #2 and subsequent frames are imaged in a dark environment.

In this case, the exposure time and the gain are suppressed to ensure that the captured image does not become excessively bright on the #1 frame (and the previous frames) and are set, for example, to their minimum values (Min). As a result, a bright and suitable image is output such that the center of gravity of the luminance histogram is equal to the target luminance (Target). Here, even if the surrounding area becomes dark during the imaging of the succeeding #2 frame, the exposure time and the gain are not immediately adjusted. The reason for this is that the center of gravity of the immediately previous #1 frame (S10) is used as a basis for control at the time of imaging the #2 frame.

As a result, imaging is performed with the exposure time and the gain set to their minimum values, which results in a rather dark output image of the #2 frame. For example, the imaging apparatus detects the departure from the target luminance by referring to the center of gravity of the luminance of the #2 frame in question during the imaging of the #3 frame (S12) and increases the exposure time and the gain when imaging the #4 frame (S14). As a result, the darkness of the image improves more or less on the #4 frame (S16).

Hereinafter, the exposure time and the gain of the #6 frame are adjusted by referring to the center of gravity of the luminance of the #4 frame during the imaging of the #5 frame, and the exposure time and the gain of the #8 frame are adjusted by referring to the center of gravity of the luminance of the #6 frame during the imaging of the #7 frame, and these steps are repeated (S18). Eventually, the exposure time and the gain converge to levels appropriate to a dark environment, and an image whose center of gravity of the luminance corresponds to the target luminance is output.

As described above, according to common automatic exposure control, the exposure time and the gain are adjusted over a period of time of approximately several frames through convolution or the like without causing the center of gravity of the luminance to instantly reach the target luminance. This prevents blinking that causes an output image to become dark at one time and bright at other time due to noise, illumination, or other cause and ensures that the image changes gradually without causing any strangeness even when the image is observed by a person through a finder.

FIG. 6 illustrates a relation between exposure time control and an image change in the image processing apparatus 10 of the present embodiment. FIG. 6 is presented in a manner similar to that of FIG. 5. It should be noted, however, that, because the exposure time is basically controlled on the basis of whether or not there is a motion of the head-mounted display 100 in the present embodiment, the second line indicates, in place of "IMAGING ENVIRONMENT," whether or not there is a "MOTION." "OUTPUT IMAGE" on the fifth line indicates the magnitude of motion blur. "EXPOSURE TIME" and "GAIN" on the third and fourth lines indicate the exposure time and the gain value set when each frame is imaged, respectively.

In this example, it is assumed that the head-mounted display 100 stays still during the imaging of the #1 frame, and that the #2 and subsequent frames are imaged with the head-mounted display 100 in motion. In this case, the parameter control section 30 of the head-mounted display 100 outputs a bright image with small noise suitable for image analysis by setting the exposure time to its maximum value (Max) on the #1 frame and suppressing the gain. This also prevents motion blur in the output image because the head-mounted display 100 stays still.

If such a motion of the head-mounted display 100 as that the speed thereof exceeds a threshold is detected, the parameter control section 30 of the image processing apparatus 10 reduces the exposure time when imaging the #3 frame (S20). At the same time, the parameter control section 30 increases the gain value to compensate for the decrease in amount of light caused by the reduced exposure time (S22). At this time, the exposure time and the gain are brought to their target values immediately without performing convolution or the like used for controlling the exposure time and the gain in a common imaging apparatus as described in FIG. 5.

Although this causes significant motion blur to appear in the output image of the #2 frame imaged when the head-mounted display 100 is in motion, motion blur is immediately suppressed on the #3 frame, which provides an output image whose luminance as a whole is large and does not change significantly. When the motion of the head-mounted display 100 satisfies a condition for changing the exposure time due, for example, to a change of the speed, the parameter control section 30 changes the exposure time and the gain value to their target values from the immediately succeeding frame, regardless of whether or not there is a motion. For this reason, the parameter control section 30 retains a table associating whether or not there is a motion and a speed range with the target values of the exposure time and the gain value in an internal memory.

As described above, when the head-mounted display 100 comes to stay still again, the parameter control section 30 sets the exposure time and the gain value back to their original values immediately. These control steps make it possible to keep the situation where the image analysis accuracy degrades to the shortest possible duration. In the situation where the output image is not observed by a person, such steps do not cause any inconvenience, and the image analysis accuracy can be maintained intact. It should be noted that, in a case where a captured image needs to be displayed, not only an imaging apparatus for image analysis purpose but also an imaging apparatus for display purpose may be mounted to the head-mounted display 100.

Figure 7A:
FIGS. 7A and 7B are diagrams that compare imaging by a common imaging apparatus and imaging by the information processing system of the present embodiment.
Figure 7B:

FIGS. 7A and 7B compare imaging by a common imaging apparatus and imaging by the information processing system 8 of the present embodiment by using actual output images. FIG. 7A illustrates an image captured by a common imaging apparatus in which motion blur has occurred due to the movement of the imaging apparatus itself, causing an outline of a ceiling light which is a subject to become blurred. Meanwhile, in the image captured by the present embodiment illustrated in FIG. 7B, the exposure time is suppressed, and the gain is increased even in the same situation, which suppresses motion blur and provides an image whose luminance as a whole remains unchanged.

According to the present embodiment described above, the exposure time of the imaging apparatus is controlled on the basis of motion information of the imaging apparatus and that of the movable unit to which the imaging apparatus is mounted. Specifically, in a case where the imaging apparatus moves at a high speed to such an extent as to cause a motion blur problem, the magnitude of motion blur is reduced by reducing the exposure time. This makes it possible to capture an image with reduced motion blur and minimize the degradation of image analysis accuracy even in the situation where the imaging apparatus moves.

It is possible, by assuring such control over the exposure time, to extend the exposure time to the extent possible while the imaging apparatus stays still and to acquire an image with high luminance and small noise. Because noise can be suppressed even at a dark location, the image analysis accuracy with the imaging apparatus that stays still can be maintained stable regardless of the environment of the surrounding area. Further, it is possible, by not performing any processing that assumes appreciation by people, to accurately acquire original real-world information and reduce the delay time that could possibly occur before the output.

It is also possible, by immediately changing the exposure time and the gain value to their target values commensurate with the change of whether or not there is a motion, to minimize the duration of motion blur and a high SN ratio and, by extension, the duration where the analysis accuracy is likely to degrade. In the present embodiment, a measured value of the motion sensor included in the movable unit is used as motion information. In recent years, electronic equipment including an imaging apparatus often incorporates a motion sensor as well to acquire the posture and the motion and to use these pieces of information for information processing. It is possible, by using such a motion sensor, to easily put in place the present embodiment without being affected by cost or weight.

The present technology has been described above on the basis of an embodiment. The above embodiment is merely illustrative, and it is understood by a person skilled in the art that the combination of components and processes can be modified in various ways and that these modification examples also fall within the scope of the present technology.

What is claimed is:

1. An image processing apparatus comprising:
a parameter control section adapted to acquire, at a predetermined rate, motion information of an imaging apparatus that captures a video and control an exposure time on a basis of the motion information; and
an output section adapted to output data obtained by performing a predetermined process on an image captured by the imaging apparatus with the exposure time; wherein:
luminance of the image as a whole is maintained at a desired level in connection with the predetermined process by comparing a target luminance and a light detection value acquired during control of the exposure time; wherein the target luminance is expressed by a center of gravity of a luminance histogram, and
the luminance histogram is that of an immediately previous frame, and the center of gravity is used as a basis for control of exposure time and gain for a current frame, such that even if a surrounding area changes to dark from light or to light from dark during the imaging of the current frame, the exposure time and gain are not immediately adjusted for the current frame.

2. The image processing apparatus of claim 1, wherein the parameter control section reduces the exposure time when a speed of the imaging apparatus exceeds a threshold.

3. The image processing apparatus of claim 2, wherein, the higher the speed of the imaging apparatus, the more the exposure time is reduced by the parameter control section.

4. The image processing apparatus of claim 1, wherein, when a condition for considering the imaging apparatus to be still is satisfied, the parameter control section sets the exposure time to its upper limit.

5. The image processing apparatus of claim 1, further comprising:
a gain processing section adapted to perform a gain process on the captured image, wherein
the parameter control section controls a gain value in a manner appropriate to a change of the exposure time.

6. The image processing apparatus of claim 5, wherein, when the motion information satisfies a condition for changing the exposure time, the parameter control section changes the exposure time and the gain value to their target values from an immediately succeeding frame.

7. The image processing apparatus of claim 5, further comprising:

an image processing section adapted to perform a noise reduction process on an image that has been subjected to the gain process, wherein the parameter control section controls a filter parameter used to reduce noise, on a basis of the gain value.

8. The image processing apparatus of claim 7, wherein the image processing section supplies an image that has been subjected to a noise reduction process to the output section without performing any other processing.

9. The image processing apparatus of claim 1, wherein the output section outputs the data to an image analysis apparatus that generates, at a predetermined rate, information associated with a real world through image analysis.

10. An information processing system comprising:

an image processing apparatus including a parameter control section adapted to acquire, at a predetermined rate, motion information of an imaging apparatus that captures a video and control an exposure time on a basis of the motion information, and an output section adapted to output data obtained by performing a predetermined process on an image captured by the imaging apparatus with the exposure time, wherein luminance of the image as a whole is maintained at a desired level in connection with the predetermined process by comparing a target luminance and a light detection value acquired during control of the exposure time, and wherein the target luminance is expressed by a center of gravity of a luminance histogram, and wherein the luminance histogram is that of an immediately previous frame, and the center of gravity is used as a basis for control of exposure time and gain for a current frame, such that even if a surrounding area changes to dark from light or to light from dark during the imaging of the current frame, the exposure time and gain are not immediately adjusted for the current frame;

the imaging apparatus; and a motion measurement apparatus adapted to measure the motion information at a predetermined rate.

11. An image acquisition method comprising:

acquiring, at a predetermined rate, motion information of an imaging apparatus that captures a video;

controlling an exposure time on a basis of the motion information; and outputting data obtained by performing a predetermined process on an image captured by the imaging apparatus with the exposure time; wherein:

luminance of the image as a whole is maintained at a desired level in connection with the predetermined process by comparing a target luminance and a light detection value acquired during control of the exposure time; wherein the target luminance is expressed by a center of gravity of a luminance histogram, and the luminance histogram is that of an immediately previous frame, and the center of gravity is used as a basis for control of exposure time and gain for a current frame, such that even if a surrounding area changes to dark from light or to light from dark during the imaging of the current frame, the exposure time and gain are not immediately adjusted for the current frame.

12. A non-transitory, computer readable storage medium containing a computer program, which when executed by a computer, causes the computer to perform a image acquisition method by carrying out actions, comprising:

acquiring, at a predetermined rate, motion information of an imaging apparatus that captures a video;

controlling an exposure time on a basis of the motion information; and outputting data obtained by performing a predetermined process on an image captured by the imaging apparatus with the exposure time; wherein:

luminance of the image as a whole is maintained at a desired level in connection with the predetermined process by comparing a target luminance and a light detection value acquired during control of the exposure time; wherein the target luminance is expressed by a center of gravity of a luminance histogram, and the luminance histogram is that of an immediately previous frame, and the center of gravity is used as a basis for control of exposure time and gain for a current frame, such that even if a surrounding area changes to dark from light or to light from dark during the imaging of the current frame, the exposure time and gain are not immediately adjusted for the current frame.

* * * * *